(12) United States Patent
Yamasaki

(10) Patent No.: US 7,943,043 B2
(45) Date of Patent: May 17, 2011

(54) MAGNETIC FIELD FORMING DEVICE FOR ACTIVE WATER AND FLUID TREATMENT APPARATUS USING THE SAME

(75) Inventor: Junichi Yamasaki, Kitakyushu (JP)

(73) Assignee: TOKO Co., Ltd., Fukuoka (JP)

( * ) Notice: Subject to any disclaimer, the term of this patent is extended or adjusted under 35 U.S.C. 154(b) by 0 days.

(21) Appl. No.: 12/293,764

(22) PCT Filed: Jan. 17, 2008

(86) PCT No.: PCT/JP2008/050500
§ 371 (c)(1),
(2), (4) Date: Sep. 19, 2008

(87) PCT Pub. No.: WO2008/136197
PCT Pub. Date: Jun. 7, 2009

(65) Prior Publication Data
US 2009/0261028 A1    Oct. 22, 2009

(30) Foreign Application Priority Data

Apr. 27, 2007  (JP) .................... 2007-120164

(51) Int. Cl.
*B01D 35/06* (2006.01)
*B03C 1/00* (2006.01)
*C02F 1/48* (2006.01)

(52) U.S. Cl. ............ 210/222; 210/223; 209/223.1; 209/224

(58) Field of Classification Search ............ 210/222, 210/223, 695; 209/223.1, 224, 232
See application file for complete search history.

(56) References Cited

U.S. PATENT DOCUMENTS

| | | | | |
|---|---|---|---|---|
| 3,951,807 A | * | 4/1976 | Sanderson | 210/222 |
| 4,299,700 A | * | 11/1981 | Sanderson | 210/222 |
| 4,319,989 A | * | 3/1982 | Wyland et al. | 209/225 |
| 4,455,229 A | * | 6/1984 | Sanderson et al. | 210/222 |
| 4,519,919 A | * | 5/1985 | Whyte et al. | 210/695 |

(Continued)

FOREIGN PATENT DOCUMENTS

JP    62-501688 A    7/1987

(Continued)

OTHER PUBLICATIONS

Korean Office Action, dated Dec. 30, 2010, for Korean Patent Application No. 2009-7005520.

*Primary Examiner* — Tony G Soohoo
*Assistant Examiner* — David C Mellon
(74) *Attorney, Agent, or Firm* — Sughrue Mion, PLLC

(57) ABSTRACT

An object of the present invention is to provide a magnetic field forming device for active water capable of uniformly forming a high magnetic field free from any unevenness in its intensity, activating a fluid regardless of the orientation of magnetic polarity of the magnets, bringing about excellent assembling efficiency not requiring assembling while checking the orientation of the magnets, being manufactured at a high product yield ratio without occurrence of defective products resulting from a difference in the orientation of the magnets, remarkably easily taking out the magnets without use of any exclusive special tool, and removing rust and stains adhered to the magnets by wiping off the magnets one by one, the maintenance efficiency of which is excellent. The magnetic field forming device for active water in which a flow path of a fluid is formed in a through hole, and the same magnetic field forming device includes a rod-shaped magnet 2 disposed with predetermined spacing from the inner wall of the through hole and having a fluid flow path formed between the inner wall and the side 3; a guide member 5 adhered to and fixed to the end part of the magnet 2, which is inserted into the interior of the through hole; and a communication portion 8 formed at the guide member 5, which communicates with the fluid flow path.

8 Claims, 8 Drawing Sheets

U.S. PATENT DOCUMENTS

| | | | | |
|---|---|---|---|---|
| 4,772,387 A | * | 9/1988 | Simoni | 210/132 |
| 4,819,808 A | * | 4/1989 | Andres et al. | 209/1 |
| 5,044,347 A | * | 9/1991 | Ullrich et al. | 123/538 |
| 5,094,742 A | * | 3/1992 | Shalhoob | 210/222 |
| 5,221,471 A | * | 6/1993 | Huntley | 210/222 |
| 5,307,779 A | * | 5/1994 | Wood et al. | 123/538 |
| 5,740,919 A | * | 4/1998 | Stowe | 209/223.1 |
| 2003/0168393 A1 | * | 9/2003 | Tsunematsu | 210/222 |

FOREIGN PATENT DOCUMENTS

| | | | |
|---|---|---|---|
| JP | 1-174095 U | | 12/1989 |
| JP | 09-057147 A | | 3/1997 |
| JP | 2001-340867 A | | 12/2001 |
| JP | 2004-351374 A | | 12/2004 |
| JP | 2005040694 | | 2/2005 |
| JP | 2008264600 A | * | 11/2008 |

* cited by examiner

← Flow of fluid

MAGNETIC FIELD FORMING DEVICE FOR ACTIVE WATER AND FLUID TREATMENT APPARATUS USING THE SAME

CROSS REFERENCE TO RELATED APPLICATION

This application is a National Stage of International Application No. PCT/JP2008/050500 filed Jan. 17, 2008, claiming priority based on Japanese Patent Application No. 2007-120164, filed Apr. 27, 2007, the contents of all of which are incorporated herein by reference in their entirety.

TECHNICAL FIELD

The present invention relates to a magnetic field forming device for active water, which activates a fluid by causing the fluid to pass through a magnetic field, and fluid treatment apparatus using the same.

BACKGROUND OF THE INVENTION

A fluid treatment apparatus has conventionally been known, which magnetically treats a fluid flowing in a piping by disposing a rod-shaped permanent magnet in the piping. As a prior art in such a fluid treatment apparatus, Patent Document 1 discloses "a water activating apparatus that magnetically treats and activates water flowing between the sides of opposed magnets (water flowing channel) by disposing the magnets with predetermined spacing therebetween with the sides of the opposed magnets caused to have different polarities."
Patent Document 1: Japanese Published Unexamined Patent Application No. 2001-340867

DISCLOSURE OF THE INVENTION

Objects to be Solved by the Invention

However, there are the following problems in the prior art.
(1) Although water flowing between magnets (water flowing channel) opposed to each other with different polarities is activated, water flowing between magnets opposed to each other with the same polarity is not activated as described in Paragraph No. 0019 of Patent Document 1. Therefore, it is necessary that the magnets are disposed with predetermined orientations when assembling the apparatus, wherein it becomes cumbersome to assemble the apparatus while checking the orientation of the magnets, and since the polarity of the magnets are not visible, there is a possibility for a worker to assemble the apparatus with a difference in the orientation of the magnets. As such, there is a problem in that since water flowing between magnets opposed to each other with the same polarity is not activated, an apparatus whose activation efficiency is very low is produced without notice.
(2) With respect to the section of the water flowing channel in the direction orthogonal to the flow of a fluid, the magnetic force will become weaker and weaker in line with moving away from the magnets, and unevenness is brought about in the intensity of the magnetic field, wherein there is a problem that the activation degree of water based on the magnets becomes uneven. Therefore, where one-time passed water that passes through a water activation apparatus only once is activated, there is a problem that the activation degree of water is lowered.
(3) Where a plurality of magnets are disposed at lattice points, as shown in Paragraph No. 0019 of Patent Document 1, since magnets of the same polarity are diagonally disposed, and water flowing between diagonally disposed magnets is not activated, it is necessary to provide a water pass restricting member between the magnets of the same polarity, wherein there is another problem that the apparatus becomes complicated.
(4) Since water passed through magnets is magnetically treated, two or more magnets are required, wherein the diameter of a housing to hold two or more magnets is made large, and there is still another problem that a small-diameter water treatment apparatus using only a single magnet cannot be produced.
(5) The stronger the magnetic force of magnets becomes, the more the fluid activation treatment efficiency of a fluid is increased. Therefore, it is preferable that intensive magnets such as a cobalt magnet of rare earth are used. However, since intensive magnets attract or repulse each other in line with intensification of magnets when fixing the magnets with a fixing plate (23) to assemble a water treatment apparatus, it becomes difficult to accommodate the magnets at the fixing plate (23), wherein it is a further problem that the working efficiency is remarkably worsened. In addition, there is another problem that, when accommodating the magnets at the fixing plate (23), fingers are caught between attracted magnets and are injured.
(6) Since magnets are rusted or stained as water passes through a water activation apparatus, it is necessary to periodically carry out maintenance to remove rust and stains adhered to the magnets by disassembling the apparatus and taking out the magnets. However, since the magnets are fixed with bolts (211) between two fixing plates (23), it is cumbersome to remove the magnets from between the fixing plates (23), wherein when taking out the magnets with the bolts (211) loosened, fingers may be caught between attracted magnets and injured, and there is still another problem that maintenance efficiency is not sufficient.

The present invention was developed in order to solve the above-described problems and shortcomings, and it is therefore an object to provide a magnetic field forming device for active water capable of uniformly forming a high magnetic field free from any unevenness in its intensity, activating a fluid regardless of the orientation of magnetic polarity of the magnets, bringing about excellent assembling efficiency not requiring assembling while checking the orientation of the magnets, being produced at a high product yield ratio without occurrence of defective products resulting from a difference in the orientation of the magnets, remarkably easily taking out the magnets without use of any exclusive special tool, and removing rust and stains adhered to the magnets by wiping off the magnets one by one, the maintenance efficiency of which is excellent.

It is another object of the present invention to provide a fluid treatment apparatus, having excellent assembling efficiency, maintenance efficiency and versatility, capable of being manufactured at a high product yield ratio without occurrence of defective products resulting from a difference in the orientation of the magnets, easily increasing the allowable quantity of flow and activating a fluid flowing in a piping etc., having a large caliber, in which magnets may be remarkably inserted and removed with ease.

Means for Solving the Objects

In order to solve the problems of the prior art, a magnetic field forming device for active water according to the present invention and a fluid treatment apparatus using the same have the following structures.

A first aspect of the present invention is a magnetic field forming device for active water, in which fluid flow paths are formed in through holes, including: a rod-shaped magnet disposed with predetermined spacing with respect to the inner wall of the through hole and having a fluid flow path formed between the inner wall and the side of the magnet; a guide member that is formed to have the maximum outer diameter smaller than the inner diameter of an opening portion at both ends of the through hole, is adhered to and fixed to one end or both ends of the magnet, and is inserted into the interior of the through hole, wherein the guide member includes a plurality of inclined portions which protrude from the outer periphery of a base portion to be radial or cross-shaped, the diameter of which is reduced toward the magnet; and a communication portion formed in spacing between adjacent inclined portions and the inner wall of the through hole.

With the structure, the following actions may be brought about.

(1) Since the magnetic field forming device for active water is provided with a rod-shaped magnet disposed with predetermined spacing to the inner wall of the through hole, a guide member adhered to and fixed to one end part or both end parts of the magnet, and inserted into the interior of the through hole, and a communication portion formed in the guide member, a fluid such as water is brought from the communication portion into a fluid flow path formed between the inner wall of the through hole and the side of the magnet, and a high magnetic field that is uniform is formed in the fluid flow path by a magnetic force of magnets disposed one by one in each of the through holes, wherein the fluid may be reliably activated, and its stability is excellent.

(2) Since a fluid is activated by the magnetic force of magnets disposed one by one in each of the through holes regardless of the orientation of magnetic polarity of the magnets, assembling efficiency thereof is excellent because it is not necessary to assemble while checking the orientation of the magnets, and may be manufactured at a high product yield ratio without occurrence of defective products resulting from a difference in the orientation of magnets.

(3) The device is provided with a rod-shaped magnet disposed with predetermined spacing to the inner wall of the through hole and a guide member that is formed to have the maximum outer diameter smaller than the inner diameter of an opening portion at both ends of the through hole, is adhered to and fixed to one end part or both end parts of the magnet, and inserted into the interior of the through hole. Therefore, where a magnet is disposed in the through hole, the magnet may be inserted with predetermined spacing to the through hole by causing the guide member to slide without the magnet magnetically adhered to the inner wall of the through hole by inserting the guide member, which is adhered to and fixed to the magnet, through one opening portion of the through hole and manually pushing the opposite side of the guide member, wherein assembling efficiency thereof is excellent.

(4) Where a magnet is taken out from the through hole, the magnet having the guide member adhered and fixed thereon may be easily pushed out from the through hole without use of any exclusive special tool by causing the magnet to slip by inserting and pushing a rod material through one opening portion of the through hole. After the magnets are pushed out, rust and stains adhered to the magnets may be wiped off one by one, wherein maintenance efficiency thereof is excellent.

(5) The magnet may be disposed in a through hole by inserting one end side of the magnet through one opening portion of the through hole and pushing manually the guide member adhered to and fixed to the other end side of the magnet. However, since the guide member is provided with an inclined portion the diameter of which is reduced toward the magnet, the inclined portion is slidingly brought into contact with the edge of the opening portion of the through hole and guides the guide member when pushing the guide member into the opening portion. Therefore, the guide member may be smoothly inserted into the opening portion, and the magnet may be disposed in the interior of the through hole.

(6) Since the sectional area of the communication portion may be increased by forming the inclined portions to be radial or cross-shaped, the pressure loss of fluid may be decreased.

Herein, there is no special restriction with respect to the through hole if it is a flow path having both the ends thereof opened, through which a fluid such as water may flow. For example, a flow path of an existing or a newly installed piping or a flow path passed through a casing may be listed.

The material of the through hole may be formed of metal such as Inconel, stainless steel, cast iron, etc., and of synthetic resin or inorganic material, etc., which are difficult to corrode by a fluid. And, a material obtained by plating the inner side of a metal such as iron and low carbon steel, etc., with nickel etc., may also be used.

Various types such as a circle, polygon, etc., may be used as the sectional shape of the through hole in the direction orthogonal to the flow path direction of a fluid.

A magnet may be used which is formed to be rod-shaped and has a roughly circular or polygonal section etc. The outer diameter of the magnet is formed to be slightly smaller than the inner diameter of the through hole. This is because predetermined spacing is secured between the side of a magnet disposed in the through hole and the inner wall of the through hole, and the fluid flow path which a fluid is permitted to flow through the spacing is achieved.

Various types such as a circle, polygon, etc., may be used as the sectional shape of the magnet.

The guide member the maximum diameter of which is formed slightly smaller than the inner diameter of the opening portion at both ends of the through hole may be used. The guide member is inserted into the interior of the opening portion at both the ends of the through hole to dispose the magnet, which is adhered and fixed between the guide members, in the through hole.

The sectional shape of the guide member is not especially restricted, for example, it may be formed to be circular, polygonal, star-shaped, or radial, etc.

The material of the guide member may be formed of metal such as Inconel, stainless steel, cast iron, etc., of synthetic resin or inorganic material, etc., which are difficult to corrode by a fluid. And, a material obtained by plating the inner side of a metal such as iron and low carbon steel, etc., with nickel etc, may be used.

Means for inserting a bolt, etc., into a through hole formed on the guide member and screwing the bolt in a threaded hole portion formed at the end part of the magnet, means for screwing a male screw secured at the guide member in a threaded hole portion formed at the end part of the magnet, and means for fitting the guide member to the end part of the magnet may be used as means for adhering and fixing the guide member and the end part of the magnet together.

A hole portion passing through the guide member and spacing between the outer edge of the guide member and the inner wall of the through hole may be listed as the communication portion. Either one may be caused to communicate with the spacing (fluid flow path) between the side of the magnet and the inner wall of the through hole.

The sectional area of the fluid flow path, size of the spacing, and the sectional area and shape of the communication portion may be appropriately designed by taking into consideration the velocity, etc., of a fluid brought into the through hole.

Herein, as an inclined portion, any portion that is formed to be plane-shaped or line-shaped may be used. Any portion of the edge end of the inclined portion being brought into contact with the side at the end part side of the magnet, being brought into contact with the edge of the end part of the magnet, or being brought into contact with the end side of the magnet may be used. In either case, since the inclined portion is slidingly brought into contact with the edge of the opening portion of the through hole, the guide member may be smoothly inserted into the through hole.

A second aspect of the present invention has a structure in which the guide member is formed of a non-magnetizable material in addition to the magnetic field forming device for active water according to the first aspect.

With the structure, the following actions may be brought about in addition to the actions according to the first aspect.
(1) Since the guide member is formed of a non-magnetizable material, the guide member may be detachably mounted by mechanical means such as screwing, etc. When carrying out maintenance, the guide member may be removed from the magnet, and rust and stains adhered to the magnet may be removed, wherein the maintenance efficiency is excellent.
(2) Since the guide member adhered to and fixed to the magnet is not magnetized, the guide member to which the magnet is adhered and fixed may be smoothly inserted into the opening portion of the through hole even in a case where the through hole is formed of a magnetizable material.

Herein, an aluminum alloy, a copper alloy, a titanium alloy, Inconel, stainless steel, high manganese steel, synthetic resin, and inorganic material etc., may be used as the non-magnetizable material of the guide member.

A fluid treatment apparatus according to a third aspect of the present invention has a structure including a casing in which one or a plurality of through holes are formed and a magnetic field forming device for active water according to any one of the first or second aspect.

With the structure, the following actions may be brought about.
(1) Since the fluid treatment apparatus is provided with a casing having through hole(s) formed therein and a magnetic field forming device for active water internally inserted into the through hole(s), a fluid such as water is brought into a fluid flow path formed in the through hole, and the fluid may be securely activated by a magnetic force of a magnet disposed one by one in each of the through holes, wherein stability thereof is excellent.
(2) Since a fluid is activated by the magnetic force of magnets disposed one by one in each of the through holes regardless of the orientation of magnetic polarity of the magnets, assembling efficiency thereof is excellent because it is not necessary to assemble while checking the orientation of the magnets, and may be manufactured at a high product yield ratio without occurrence of defective products resulting from a difference in the orientation of magnets.
(3) Since the fluid brought into the through holes is activated by a magnetic force of a magnet disposed one by one in each of the through holes regardless of the orientation of the polarity of the magnets, the fluid may be activated regardless of the polarity of the magnet disposed in the through holes adjacent to each other even in a case where a plurality of through holes are formed in the form of a lattice or are minutely disposed. Therefore, it is possible to increase the allowable flow capac-ity only by increasing the number of through holes, wherein a fluid flowing in a piping etc., of large caliber may be activated without any pressure loss.
(4) Since the magnetic field forming device for active water may be easily inserted into and detached from the through holes formed in the casing, excellent assembling efficiency and maintenance efficiency are brought about.

Herein, the casing may be formed of metal such as Inconel, stainless steel, casting, of synthetic resin or inorganic material, etc., which are difficult to corrode by a fluid. A casing which is block-shaped etc., may be drilled to form through holes. A tubular body having through holes may be utilized as the casing. Further, a plurality of tubular members are bundled and may be used as the casing.

Where a plurality of through holes are formed in a casing, it is preferable that adjacent through holes are formed with appropriate spacing and through holes are formed roughly parallel to each other. This is because the ratio of the through holes to the cubic volume of the casing is increased to secure a flow capacity of a fluid.

In addition, the casing is disposed in a piping through which city water or industrial water etc., flows, and may activate the fluid. By disposing the casing in a piping through which not only one-time passed water but also circulating water for a cooling tower etc., flows, the circulating water may also be activated.

A fourth aspect of the present invention has a structure in which the casing is formed of a magnetizable material, in addition to the fluid treatment apparatus according to the third aspect.

With the structure, the following action may be brought about in addition to the actions according to the third aspect.
(1) Since the casing is formed of a magnetizable material, the inner wall of through holes formed in the casing is magnetized, the magnetic flux density of the magnets may be remarkably increased, and a high magnetic field may be formed, wherein activation efficiency of fluid may be increased.

Herein, as the magnetizable material of the casing, iron, low carbon steel, silicon steel, permalloy, Sendust, KS steel, MK steel, Fe—Co alloy, Cu—Ni—Fe alloy, Fe—Cr—Co alloy, etc., may be used. The inner surface of the through holes may be plated. Where the casing is formed of a magnetizable material, a guide member that is formed of a non-magnetizable material is used. This is because, since the guide member adhered to and fixed to the magnet is not magnetized, the guide member having the magnet adhered and fixed thereon may be smoothly inserted through the opening portion of the through holes.

A fifth aspect of the present invention has a structure equipped with a treatment chamber that is disposed on the way of piping and the casing is detachably accommodated in, in addition to the fluid treatment apparatus according to the third or fourth aspect.

With the structure, the following action may be brought about in addition to the actions obtained by the third or fourth aspect.
(1) Since the casing is detachably accommodated in the treatment chamber disposed on the way of piping, the casing may be taken out from the treatment chamber, and the magnetic field forming device for active water may be easily taken out from the casing taken out from the treatment chamber when carrying out maintenance. Therefore, rust and stains adhered to the magnets may be easily cleaned off and wiped off, wherein maintenance efficiency thereof is excellent.

Herein, the treatment chamber is formed of a material being light in weight and being difficult to corrode, such as titanium alloy, Inconel, stainless steel, high manganese steel, or synthetic resin, inorganic material, and iron etc., the surface of which is provided with a plated membrane.

Effects of the Invention

As described above, according to the magnetic field forming device for active water and the fluid treatment apparatus using the same, the following effects may be brought about.

According to the first aspect of the invention, (1) a fluid such as water is brought from the communication portion into a fluid flow path formed between the inner wall of the through hole and the side of a magnet, and a high magnetic field that is uniform is formed in the fluid flow path by a magnetic force of a magnet disposed one by one in each of the through holes. Therefore, it is possible to provide a magnetic field forming device for active water, having excellent stability, by which the fluid may be securely activated.

(2) since a fluid is activated by the magnetic force of magnets disposed one by one in each of the through holes regardless of the orientation of magnetic polarity of the magnets, assembling efficiency thereof is excellent because it is not necessary to assemble while checking the orientation of the magnets, and may be manufactured at a high product yield ratio without occurrence of defective products resulting from a difference in the orientation of magnets.

(3) it is possible to provide a magnetic field forming device for active water, being excellent in assembling efficiency, where a magnet is disposed in a through hole, the magnet may be inserted with predetermined spacing to the through hole by causing the guide member to slide without the magnet magnetically adhered to the inner wall of the through hole by inserting the guide member, which is adhered to and fixed to the magnet, through one opening portion of the through hole and manually pushing the opposite side of the guide member.

(4) it is possible to provide a magnetic field forming device for active water, being excellent in maintenance efficiency, for which, where a magnet is taken out from the through hole, the magnet having the guide member adhered and fixed thereon may be easily pushed out from the through hole without use of any exclusive special tool by causing the magnet to slip by inserting and pushing a rod material through one opening portion of the through hole. After the magnets are pushed out, rust and stains adhered to the magnets may be wiped off one by one.

(5) when disposing a magnet by pushing a guide member into a through hole, since the guide member is provided with an inclined portion the diameter of which is reduced toward the magnet, the inclined portion is slidingly brought into contact with the edge of the opening portion of the through hole and guides the guide member when pushing the guide member into the opening portion. Therefore, it is possible to provide a magnetic field forming device for active water, having excellent work efficiency, which is capable of smoothly inserting the guide member in the opening portion and disposing the magnet into the interior of the through hole.

(6) Since the sectional area of the communication portion may be increased by forming the inclined portions to be radial or cross-shaped, the pressure loss of fluid may be decreased.

According to the second aspect of the invention, in addition to the effects of the first aspect, (1) it is possible to provide a magnetic field forming device for active water, having excellent maintenance efficiency, which, since the guide member is formed of a non-magnetizable material, is capable of detachably mounting the guide member by mechanical means such as screwing, etc., and removing rust and stains adhered to the magnet by removing the guide member from the magnet when carrying out maintenance.

(2) it is possible to provide a magnetic field forming device for active water that is capable of smoothly inserting the guide member to which the magnet adhered and fixed into the opening portion of a through hole even in a case where the through hole is formed of a magnetizable material since the guide member adhered to and fixed to the magnet is not magnetized.

According to the third aspect of the invention, (1) it is possible to provide a fluid treatment apparatus having excellent stability, which, since it is provided with a casing having through holes formed therein and a magnetic field forming device for active water internally inserted into the through hole(s), a fluid such as water is brought into a fluid flow path formed in the through hole, and the fluid may be reliably activated by a magnetic force of a magnet disposed one by one in each of the through holes.

(2) it is possible to provide a fluid treatment apparatus that is excellent in assembling efficiency since a fluid is activated by the magnetic force of magnets disposed one by one in each of the through holes regardless of the orientation of magnetic polarity of the magnets and it is not necessary to assemble while checking the orientation of the magnets, and may be manufactured at a high product yield ratio without occurrence of defective products resulting from a difference in the orientation of magnets.

(3) since the fluid brought into the through holes is activated by a magnetic force of a magnet disposed one by one in each of the through holes regardless of the orientation of the polarity of the magnets, the fluid may be activated regardless of the polarity of the magnet disposed in the through holes adjacent to each other even in a case where a plurality of through holes are formed in the form of a lattice or are minutely disposed. Therefore, it is possible to provide a fluid treatment apparatus, which is excellent versatility, capable of increasing the allowable flow capacity only by increasing the number of through holes, and capable of activating a fluid flowing in a piping etc., of large caliber.

(4) it is possible to provide a fluid treatment apparatus that is excellent in assembling efficiency and in maintenance efficiency since the magnetic field forming device for active water may be easily inserted into and detached from the through holes formed in the casing.

According to the fourth aspect of the invention, in addition to the third aspect, (1) since the casing is formed of a magnetizable material, it is possible to provide a fluid treatment apparatus having high activation treatment efficiency, which is capable of remarkably increasing the magnetic flux density of the magnets by magnetizing the inner wall of through holes formed in the casing, and capable of forming a high magnetic field.

According to the fifth aspect of the invention, in addition to the effects of the third or fourth aspect, (1) since the casing is detachably accommodated in the treatment chamber disposed on the way of piping, the casing may be taken out from the treatment chamber, and the magnetic field forming device for active water may be easily taken out from the casing taken out from the treatment chamber when carrying out maintenance. Therefore, it is possible to provide a fluid treatment apparatus being excellent in maintenance efficiency, which is capable of easily wiping off and cleaning off rust and stains adhered to the magnets.

Figure 1A:
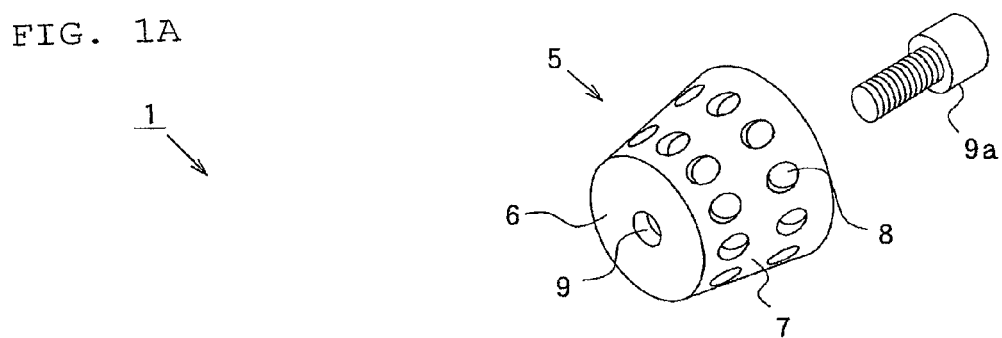
FIG. 1A is a disassembled perspective view showing a magnetic field forming device for active water according to Embodiment 1.

DESCRIPTION OF REFERENCE NUMERALS 1, 1a Magnetic field forming device for active water
2 Magnet
3 Side
4 End side
4a Threaded hole portion
5, 5a, 5b Guide member
6, 6a, 6b Base portion
7, 7a, 7b Inclined portion
8, 8a, 8b Communication portion
9 Hole portion
9a Screwing member
9b Threaded portion
10, 10a Casing
11 Through hole
12 Opening portion
13 Threaded hole portion
21 Fluid treatment apparatus
22 Treatment chamber
23 Opening portion
23a Threaded hole
23b Suspension member
24 Communication tube
25, 27 Flange
26 Piping
28 Bottom
29 Contacting portion
30 Distribution portion
31 Fluid flow path
41, 41a Fluid treatment apparatus
42 Treatment chamber
43 Casing
44 Block
45 Cavity portion
51 Fluid treatment apparatus
52 Communication tube
61 Magnetic field forming device for active water
62 Guide member
63 Base portion
64 Inclined portion
65 Communication portion
66 Screwing member
67 Guide member
68 Fall-out preventing portion
71 Magnetic field forming device for active water
72 Casing side guide member
73 Guide member through hole
74 Protruding portion

BEST MODE FOR CARRYING OUT THE INVENTION

Hereinafter, a description is given of the best mode to embody the present invention with reference to the drawings.

Embodiment 1

Figure 1A:
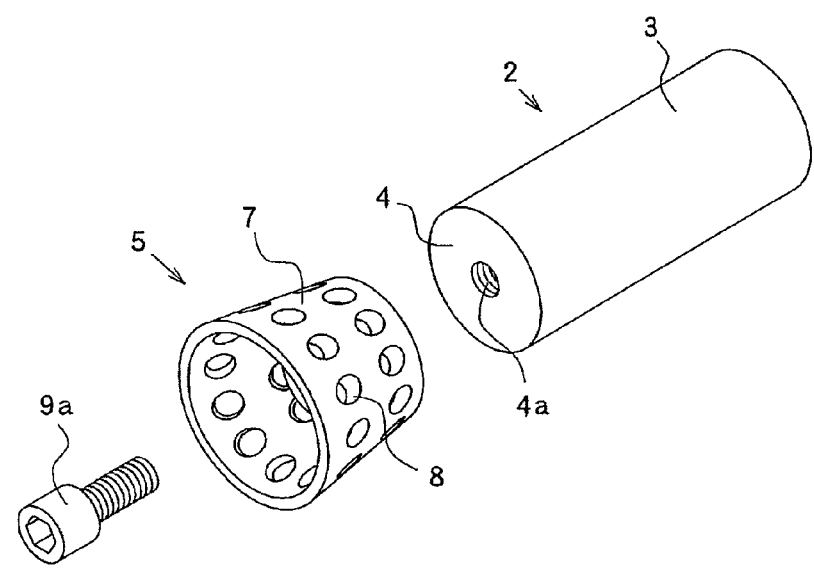
Figure 1B:
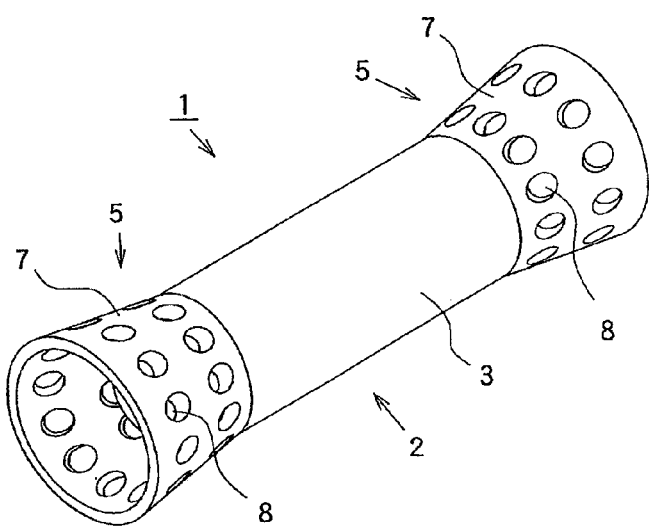
FIG. 1B is a perspective view showing the magnetic field forming device for active water.
Figure 2:
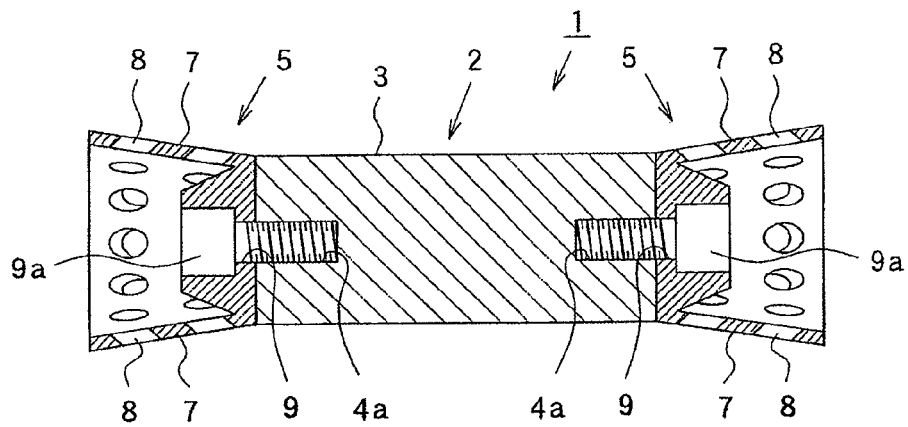
FIG. 2 is a sectional view showing the major parts of the magnetic field forming device for active water.

FIG. 1A is a disassembled perspective view showing a magnetic field forming device for active water according to Embodiment 1 of the present invention, FIG. 1B is a perspective view showing the magnetic field forming device for active water, and FIG. 2 is a sectional view showing the major parts of the magnetic field forming device for active water.

In FIG. 1 and FIG. 2, reference numeral 1 denotes a magnetic field forming device for active water according to Embodiment 1 of the present invention, 2 denotes a magnet formed of rare earth Cobalt magnet etc., formed to be like a round bar, 3 denotes the side of the magnet 2, 4 denotes an end side of the magnet 2, 4a denotes a threaded hole portion formed at the end side 4 of the magnet 2, 5 denotes a guide member that is formed of a non-magnetizable material such as aluminum alloy, copper alloy, titanium alloy, Inconel, stainless steel, high manganese steel, synthetic resin, and inorganic material, etc., and is adhered to and fixed to the end sides 4 of both end parts of the magnet 2, respectively, 6 denotes a base portion of the guide member brought into contact to the end side 4 of the magnet 2, the outer diameter of which is formed to be the same as the outer diameter of the magnet 2, and 7 denotes an inclined portion annularly formed, the diameter of which is reduced toward the base portion 6, wherein one edge end of the inclined portion 7 is brought into contact with the edge of the side 3 of the magnet 2. Reference numeral 8 denotes a plurality of communication portions formed so as to pass through the inclined portion 7 of the guide member 5, 9 denotes a hole portion formed so as to pass through the center of the base portion 6, and 9a denotes a screwing member that is inserted into the hole portion 9, screwed in the threaded hole portion 4a formed at the end side 4 of the magnet 2, and pushes the base portion 6 to the magnet 2.

Next, a description is given of a fluid treatment apparatus.

Figure 3:
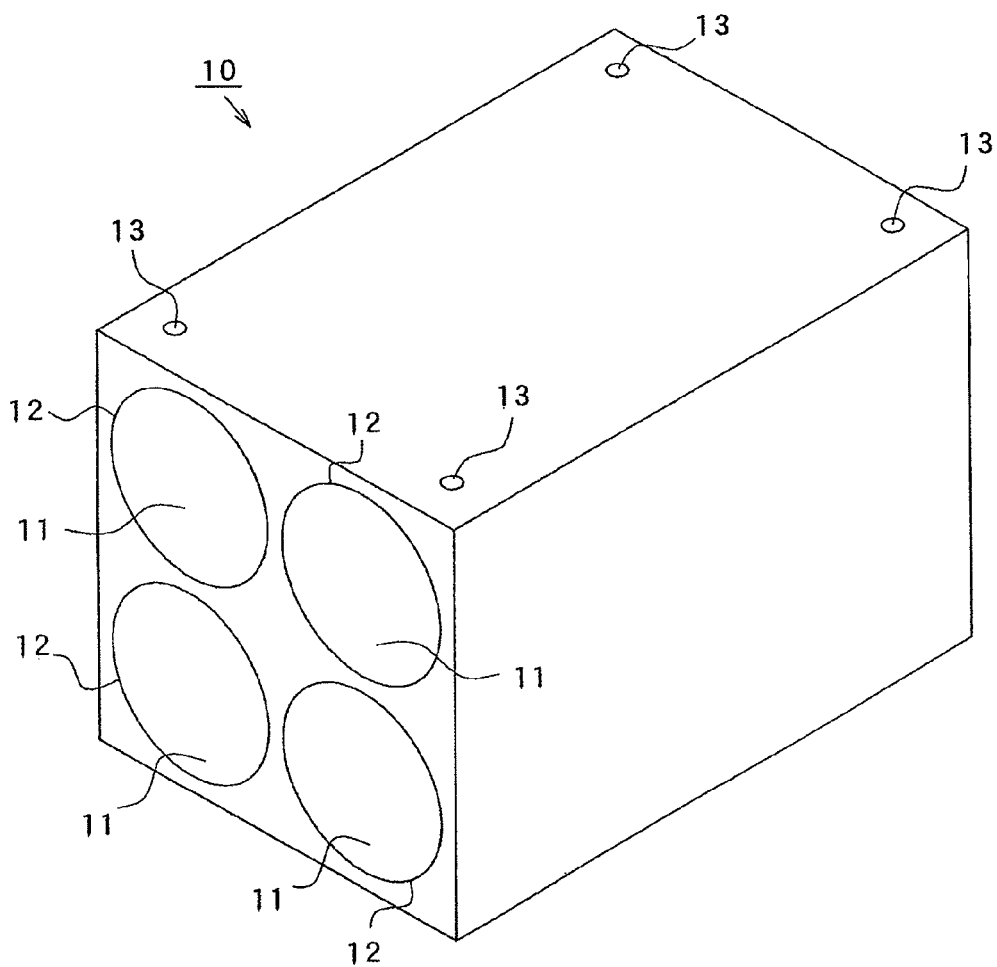
FIG. 3 is a perspective view showing a casing of a fluid treatment apparatus according to Embodiment 1.
Figure 4:
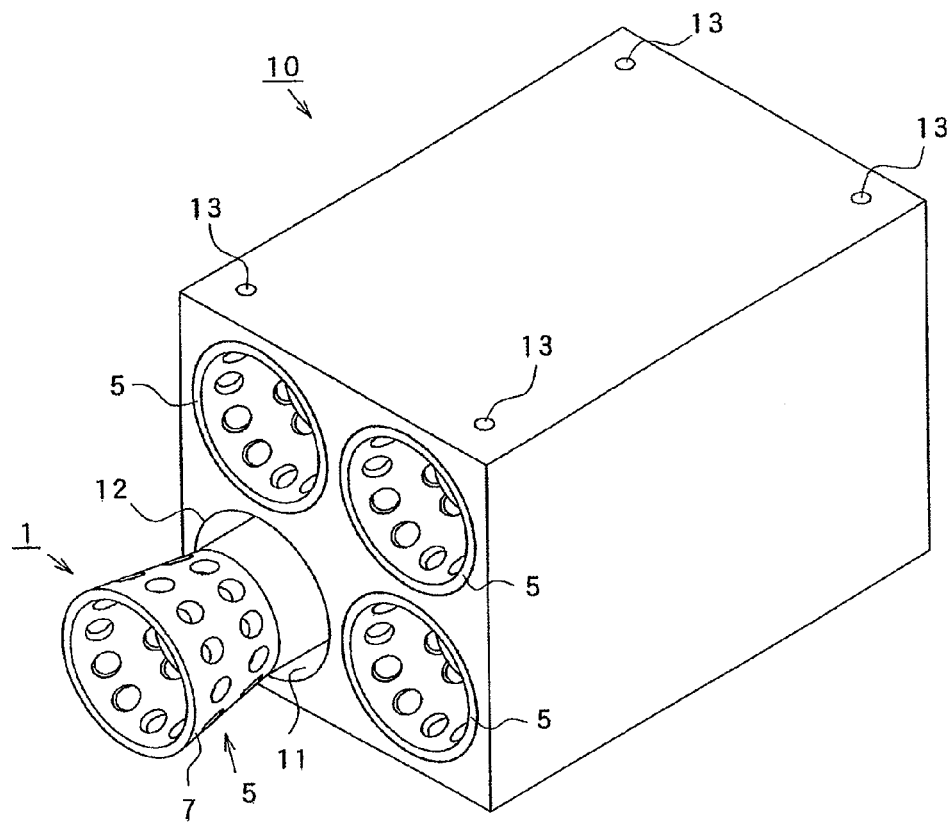
FIG. 4 is a perspective view showing a state where magnetic field forming devices for active water are accommodated in a casing.
Figure 5:
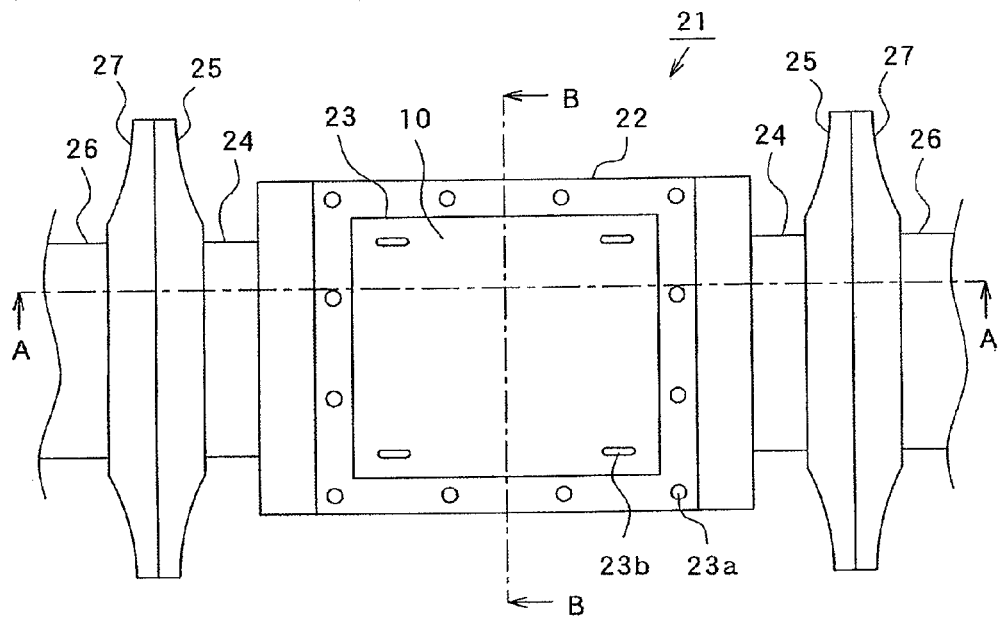
FIG. 5 is a plan view showing the fluid treatment apparatus.
Figure 6:
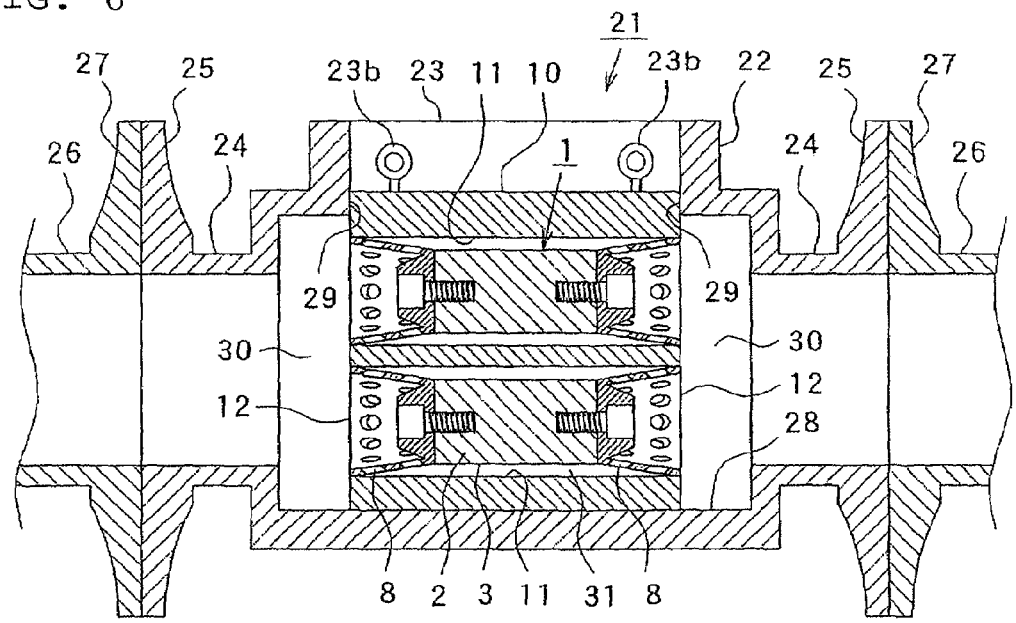
FIG. 6 is a sectional view taken along the line A-A in FIG. 5.
Figure 7:
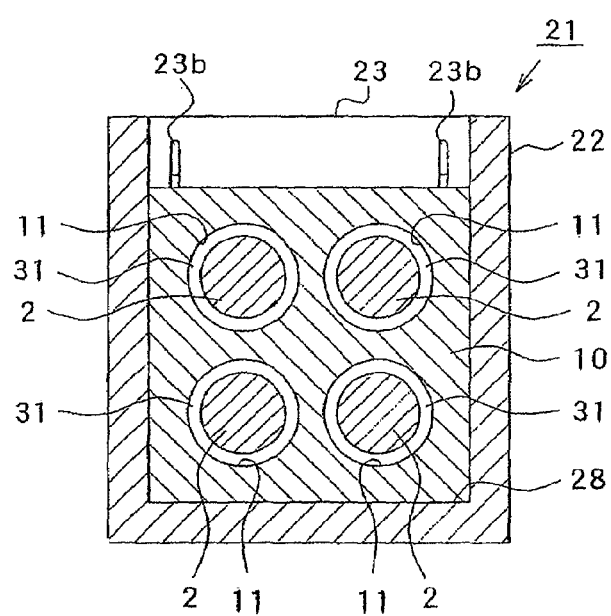
FIG. 7 is a sectional view taken along the line B-B in FIG. 5.

FIG. 3 is a perspective view showing a casing of a fluid treatment apparatus according to Embodiment 1 of the present invention, FIG. 4 is a perspective view showing a state where magnetic field forming devices for active water are accommodated in a casing, FIG. 5 is a plan view showing the fluid treatment apparatus, FIG. 6 is a sectional view taken along the line A-A in FIG. 5, and FIG. 7 is a sectional view taken along the line B-B in FIG. 5.

In FIG. 3 and FIG. 4, reference numeral 10 denotes a casing formed to be a cube or a rectangular parallelepiped, which is formed of a magnetizable magnetic material such as iron, low carbon steel, silicon steel, permalloy, Sendust, KS steel, MK steel, Fe—Co alloy, Cu—Ni—Fe alloy, Fe—Cr—Co alloy, etc., and 11 denotes a through hole opened to two sides opposed to each other, passing through the casing 10. In the present embodiment, four through holes 11 positioned at lattice points are formed to be roughly parallel to each other with appropriate spacing. Also, the through hole 11 is formed so that the inner diameter thereof becomes slightly larger by 2 through 10 mm than the outer diameter of the magnet 2. In addition, the through hole 11 is formed so that the length thereof becomes the same as the length of the magnetic field forming device 1 for active water. Reference numeral 12 denotes an opening portion of the through hole 11, 13 denotes a threaded hole portion formed at four corners of the upper surface of the casing 10. In the present embodiment, the maximum outer diameter of the guide member 5 is the outer diameter of the other edge end of the inclined portion 7, and is formed to be slightly smaller than the inner diameter of the opening portion 12 of the through hole 11. Accordingly, the guide member 5 may be inserted into the interior of the opening portion 12 of the through hole 11.

In FIG. 5, reference numeral 21 denotes a fluid treatment apparatus according to Embodiment 1 of the present invention, 22 denotes a treatment chamber of the fluid treatment apparatus 21, which is formed of a light material almost free from corrosion, such as titanium alloy, Inconel, stainless steel, high manganese steel, synthetic resin, inorganic material, etc., and is formed to be like a rectangular parallelepiped box having a bottom with its upper surface open. Reference numeral 23 denotes an opening portion formed on the upper surface of the treatment chamber 22, on which a cover (not illustrated) is mounted when being in use, 23a denotes threaded holes formed in a plurality at the edge part of the opening portion 23, in which the cover (not illustrated) is fixed with screws, 23b denotes a suspension member such as an eyebolt, which is formed on the upper surface of the casing 10 and is screwed down in the threaded hole portion 13, wherein the casing 10 in which the magnetic field forming device 1 for active water is accommodated is detachably accommodated in the treatment chamber 22 by being suspended by means of the suspension member 23b. Reference numeral 24 denotes a communication tube of the fluid treatment apparatus 21, which communicates with both ends in the flow path direction of the treatment chamber 22, respectively, 25 denotes a flange of the fluid treatment apparatus 21, which is disposed at the end part of the communication tube 24, 26 denotes piping in which a fluid such as water flows, and 27 denotes a flange of the piping 26, which is disposed at the end part of the piping 26 and is connected to the flange 25.

In FIG. 6 and FIG. 7, reference numeral 28 denotes a bottom of the treatment chamber 22, 29 denotes a contacting portion that is brought into contact with the upper end portion of the side on which the opening portion 12 of the casing 10 placed on the bottom 28 of the treatment chamber 22 is formed, 30 denotes a distribution portion formed to be hollow between the casing 10 of the treatment chamber 22, to which the communication tube 24 is connected, and the communication tube 24, and the sectional area of the flow path of the distribution portion 30 is formed wider than the sectional area of the flow path of the communication tube 24. Therefore, a fluid flowing through the communication tube 24 is decelerated and distributed by the distribution portion 30, and may be uniformly brought into the respective through holes 11. Reference numeral 31 denotes a fluid flow path formed between the inner wall of the through hole 11 and the side 3 of the magnet 2 disposed with spacing to the inner wall, wherein a fluid that has flown through the communication tube 24 passes through the distribution portion 30 and the communication portion 8 and is brought into the fluid flow path 31, and then passes through the other communication portion 8 and flows to the other communication portion 24.

A description is given below of a method for producing a fluid treatment apparatus 21 using a magnetic field forming device 1 for active water according to Embodiment 1 of the present invention, which is constructed as described above.

First, the base portion 6 of the guide member 5 is brought into contact with one end side 4 of the magnet 2, the screwing member 9a is inserted into the hole portion 9 and is screwed down in the threaded hole portion 4a, the base portion 6 of the guide member 5 is pushed to and fixed to the magnet 2, and the guide member 5 is adhered to and fixed to the end part of the magnet 2. Another guide member 5 is adhered to and fixed to the other end side 4 of the magnet 2 as well, thereby producing a magnetic field forming device 1 for active water.

Next, after one guide member 5 of the magnetic field forming device 1 for active water is inserted into one opening portion 12 of the through hole 11 formed in the casing 10, the other guide member 5 is manually pushed in, and the guide member 5 is caused to slide in the through hole 11. Since the maximum outer diameter of the guide member 5 is larger than the outer diameter of the magnet 2, the magnet 2 is smoothly pushed in with appropriate spacing secured to the through hole 11 without being attracted to the inner wall of the through hole 11 by a magnetic force. As the other guide member 5 reaches the opening portion 12, the other guide member 5 is smoothly inserted into the opening portion 12 since the inclined portion 7 is slidingly brought into contact with the edge of the opening portion 12 and guided. Thus, it is possible to remarkably easily arrange the magnet 2 in the interior of the through hole 11 concentrically with the through hole 11. Similarly, a magnetic field forming device 1 for active water is inserted into all the through holes 11.

Next, by suspending the casing 10, in which the magnetic field forming device 1 for active water is accommodated, by means of the suspension member 23b, the casing 10 is accommodated in the treatment chamber 22 having flanges 25 connected to both the ends thereof. A cover (not illustrated) is attached to the opening portion 23 of the treatment chamber 22, whereby a fluid treatment apparatus 21 according to Embodiment 1 may be produced.

In addition, when carrying out maintenance, it is possible to disassemble the fluid treatment apparatus 21 in a reverse procedure to the explanation described above. In this case, when taking out the magnetic field forming device 1 for active water from the through holes 11 of the casing 10, a synthetic resin-made or wooden rod material is pushed to the end side of the guide member 5 and is pushed into the through hole 11, whereby the magnetic field forming device 1 for active water may be remarkably easily taken out.

Since the magnetic field forming device 1 for active water according to Embodiment 1 of the present invention and a fluid treatment apparatus 21 using the same are constructed as described above, the following actions may be brought about. (1) Since the magnetic field forming device 1 for active water is provided with a rod-shaped magnet 2 disposed with spacing to the inner wall of the through hole 11, guide members 5 adhered to and fixed to the respective end sides 4 of the magnet 2 and inserted into the interior of the opening portions 12 at both ends of the through hole 11, and a communication portion 8 formed at the guide member 5, a fluid such as water is brought from the communication portion 8 into the fluid flow path 31 formed between the inner wall of the through hole 11 and the side 3 of the magnet 2, and a uniform high magnetic field is formed in the fluid flow path 31 by a magnetic force of the magnet 2 disposed one by one in each of the through holes 11. Therefore, the fluid may be reliably activated, wherein stability is excellent.

(2) Since a fluid is activated by the magnetic force of the magnets 2 disposed one by one in each of the through holes regardless of the orientation of magnetic polarity of the magnets 2, assembling efficiency thereof is excellent because it is not necessary to assemble while checking the orientation of the magnets 2, and may be manufactured at a high product yield ratio without occurrence of defective products resulting from a difference in the orientation of the magnets 2.

(3) When disposing the magnet 2 in the through hole 11, guide members 5 may be inserted into the interior of the opening portions 12 at both ends of the through holes 11 by inserting one guide member 5 into one opening portion 12 of the through hole and manually pushing the other guide member 5, wherein the magnet 2 may be easily disposed with spacing to the through hole 11 between the guide members 5, and the assembling efficiency is excellent.

(4) Where the magnet 2 is taken out from the through hole 11, the magnet 2 having the guide member 5 adhered and fixed thereon may be easily pushed out from the through hole 11 without use of any exclusive special tool by causing the magnet to slip by inserting and pushing a rod material through one opening portion 12 of the through hole 11. After the magnets 2 are pushed out, rust and stains adhered to the magnets 2 are wiped off one by one, wherein maintenance efficiency thereof is excellent.

(5) Since the guide member 5 is provided with an inclined portion 7 the diameter of which is reduced toward the magnets 2, the inclined portion 7 slidingly guides the guide member 5 along the edge of the opening portion 12 of the through hole 11 when pushing the other guide member 5 into the opening portion 12, wherein the other guide member 5 is smoothly inserted into the opening portion 12 and the magnet 2 may be disposed in the interior of the through hole 11.

(6) Since the guide member 5 is formed of a non-magnetizable material, the guide member 5 may be detachably mounted by mechanical means such as screwing, etc. When carrying out maintenance, the guide member 5 may be removed from the magnet 2, and rust and stains adhered to the magnet 2 may be removed, wherein the maintenance efficiency is excellent.

(7) Since the guide member 5 adhered to and fixed to the magnet 2 is not magnetized, the guide member 5 is not magnetically adhered to the opening portion 12 of the through hole 11 formed of a magnetizable material, and may be smoothly inserted into the through hole 11.

(8) Since a fluid brought in the through hole 11 is activated regardless of the orientation of magnetic polarity of the magnets 2 by a magnetic force of the magnets 2 disposed one by one in the through holes 11, respectively, a fluid can be activated regardless of the polarity of the magnet 2 disposed in adjacent through holes 11 even in a case where a plurality of through holes 11 are formed, wherein it is possible to increase the allowable flow capacity only by increasing the number of through holes 11, and a fluid flowing in a piping etc., having a large caliber may also be activated.

(9) Since the casing 10 is formed of a magnetizable material, the inner wall of through hole 11 formed in the casing 10 is magnetized by the magnet 2, the magnetic flux density of the magnet 2 may be remarkably increased, and a high magnetic field may be formed, wherein activation efficiency thereof may be increased.

(10) Since the casing 10 is detachably accommodated in the treatment chamber 22 disposed on the way of piping 26, the casing 10 can be taken out from the treatment chamber 22, and the magnetic field forming device 1 for active water may be taken out from the casing 10 taken out from the treatment chamber 22 when carrying out maintenance. Therefore, rust and stains adhered to the magnet 2 can be easily cleaned off and wiped off, wherein maintenance efficiency thereof is excellent.

(11) Since the distribution portion 30 is formed in the treatment chamber 22, the fluid flown from the communication tube 24 into the distribution portion 30 of the treatment chamber 22 is decelerated, and the fluid may be evenly brought into four through holes 11. Therefore, activation treatment of fluid may be reliably carried out by magnetization.

(12) Since the inner diameter of the through hole 11 is formed to be larger by 2 through 10 mm than the outer diameter of the magnet 2, it is possible to make the spacing 1 through 5 mm between the side 3 of the magnet 2 and the inner wall of the through hole 11. Also, since the magnetic flux density and the sectional area of the fluid flow path 31 may be varied by the dimensions of the spacing, it is possible to appropriately set the dimensions of the spacing in response to the type (one-time passed water or circulating water) and flow capacity of a fluid subjected to magnetization treatment, wherein excellent versatility is brought about.

Herein, in the present embodiment, a description was given of the case where four through holes 11 are disposed in the form of a lattice in the casing 10. However, there is no restriction in the number and arrangement of the through holes 11, wherein one or more through holes may be formed freely in the casing 10 in response to the diameter of the piping and the flow capacity etc., by setting the number and arrangement thereof.

In addition, a description was given of the case where the axial center of the through hole 11 is formed to be parallel to the axial center of the piping 26. However, there is no restriction in regard to the axial center, wherein there may be cases where the casing 10 is formed to be inclined with respect to the axial center of the piping 26 by 1 to 10 degrees, whereby it is possible to increase the activation treatment efficiency of a fluid.

Also, a description was given of the case where the edge end of the inclined portion 7 of the guide member 5 is brought into contact with the edge (the edge of the side 3) of the end part of the magnet 2. However, there may be cases where the edge end of the inclined portion 7 is brought into contact with the end side 4 of the magnet 2 or the side 3 at the end part side of the magnet 2. In these cases, similar actions may be brought about.

Further, a description was given of the case where the length of the magnetic field forming device 1 for active water and the length of the through hole 11 are formed almost the same. However, there may be a case where the magnetic field forming device 1 for active water is formed shorter than the length of the through hole 11. Although, in this case, similar actions may be brought about, there may be a case where the activation treatment efficiency of a fluid is lowered if the length of the magnet 2 is made shorter. Therefore, the length of the magnet 2 may be appropriately set in response to the fluid flow capacity, etc.

Still further, although a description was given of the case where the through holes 11 are formed in the casing 10 and the magnetic field forming device 1 for active water is inserted into the through holes 11, flow paths of the existing piping or newly installed piping may be used as the through holes.

Also, although a description was given of the case where the through holes 11 are formed in a single casing 10, there may be cases where through holes and grooves are formed in divided fragments of a casing, and through holes are completed by assembling the casing by combining the corresponding fragments. Such an action may be brought about, by which a large-sized casing may be easily produced by assembling the casing by combining the fragments.

In addition, where the velocity of a fluid is fast or where a fluid treatment apparatus is installed on an inclined plane, there is a fear that the magnetic field forming device 1 for active water inserted into the through holes 11 comes out from the through hole 11 by a force of the fluid or the gravity thereof. Therefore, there maybe cases where a stopper member such as a plate material, with which the edge end of the guide member 5 is brought into contact, is provided at the end side of the casing 10 in which an opening portion 12 located, at the downstream side or down side of the through hole 11. The stopper member is detachably disposed. Therefore, there is no fear that the magnetic field forming device 1 for active water comes out from the through hole 11 due to a force of fluid or the gravity thereof, wherein excellent reliability is secured.

Embodiment 2

Figure 8:
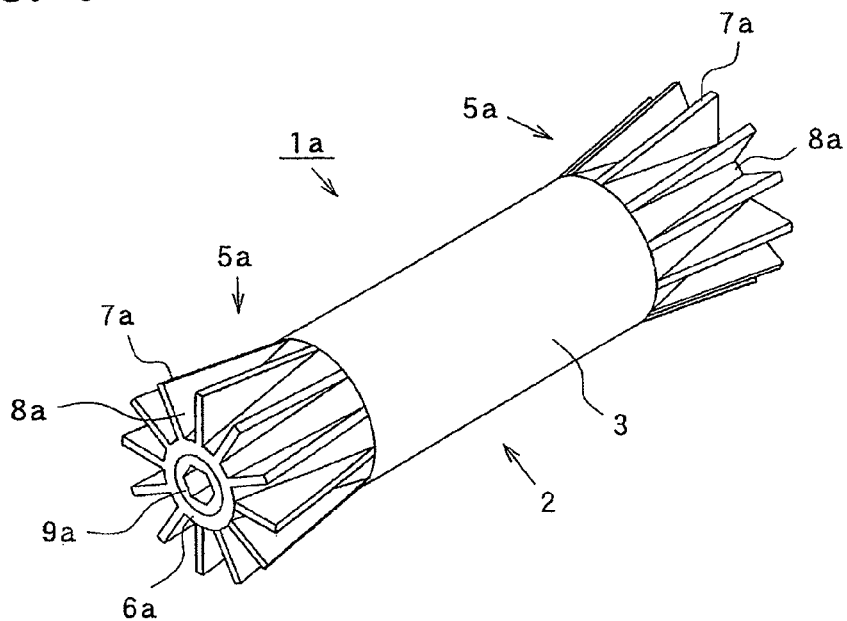
FIG. 8 is a perspective view showing a magnetic field forming device for active water according to Embodiment 2.
Figure 9A:
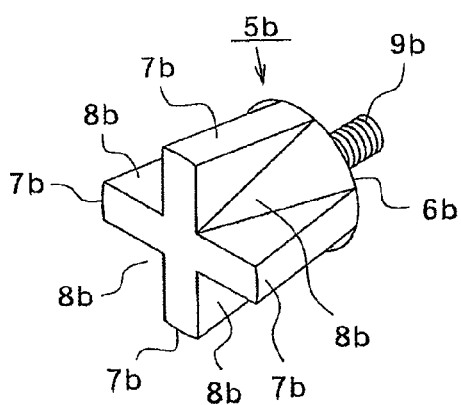
FIG. 9A is a perspective view observed from an inclined portion side of a guide member of a magnetic field forming device for active water according to a modified version of Embodiment 2.
Figure 9B:
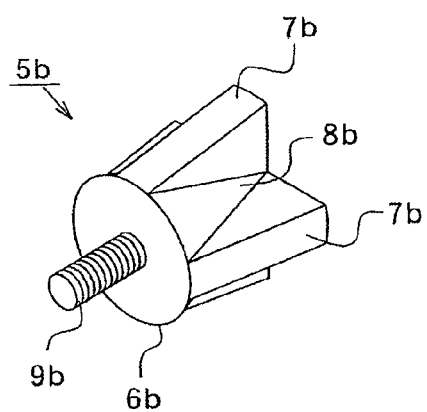
FIG. 9B is a perspective view observed from a base portion side.

FIG. 8 is a perspective view showing a magnetic field forming device for active water according to Embodiment 2, FIG. 9A is a perspective view observed from the inclined portion side of a guide member of a magnetic field forming device for active water according to a modified version of Embodiment 2, and FIG. 9B is a perspective view observed from the base portion side. Also, parts that are similar to those described in Embodiment 1 are given the same reference numerals, and the description thereof is omitted.

In FIG. 8, reference numeral 1a denotes a magnetic field forming device for active water according to Embodiment 2 of the present invention, 2 denotes a magnet, 3 denotes the side of the magnet 2, 5a denotes a guide member formed of a non-magnetizable material such as aluminum alloy, copper alloy, titanium alloy, Inconel, stainless steel, high manganese steel, synthetic resin, inorganic material, etc., 6a denotes a base portion formed to be cylindrical, the end portion of which is brought into contact with the end part of the magnet 2, and 7a denotes an inclined portion radially protruding around the base portion 6a, the diameter of which is reduced toward the magnet 2, wherein one edge end of the inclined portion 7a is brought into contact with the edge of the side 3 of the magnet 2. Reference numeral 8a denotes a communication portion formed between the radially formed inclined portions 7a, 9a denotes a screwing member that is provided so as to pass through the center of the base portion 6a, screwed in a threaded hole portion (not illustrated) formed at the end side of the magnet 2, and adheres and fixes the guide member 5a to the magnet 2.

In FIG. 9, reference numeral 5b denotes a guide member formed of a non-magnetizable material, 6b denotes a base portion formed to be conical, the end part of which is brought into contact with the end part of the magnet 2. Reference numeral 7b denotes an inclined portion that is provided so as to protrude to be cross-shaped around the base portion 6b, the diameter of which is reduced toward the end part (the conical bottom) of the base portion 6b, 8b denotes a communication portion formed between the inclined portions 7a, 9b denotes a threaded portion that is provided so as to protrude at the center of the end part of the base portion 6b integrally with the base portion 6b, is screwed into the threaded hole portion formed at the end side of the magnet 2 (not illustrated), and adheres and fixes the guide member 5b to the magnet 2.

A method for producing the magnetic field forming device 1a for active water according to Embodiment 2 of the present invention, which is constructed as described above, and a fluid treatment apparatus using the guide member 5b of a modified version is similar to the method described in connection to Embodiment 1, and the description thereof is omitted.

Since a magnetic field forming device for active water according to Embodiment 2 of the present invention and a guide member of the modified version are constructed as described above, the following actions may be brought about in addition to those described in Embodiment 1.

(1) Since the sectional area of the communication portion 8a or 8b may be increased by forming the inclined portion 7a or 7b to be radial or cross-shaped, the pressure loss of fluid may be decreased.

(2) Since the screwing member 9b is formed integral with the base portion 6b, the number of components may be decreased to reduce the number of production steps, wherein the productivity is excellent.

Embodiment 3

Figure 10:
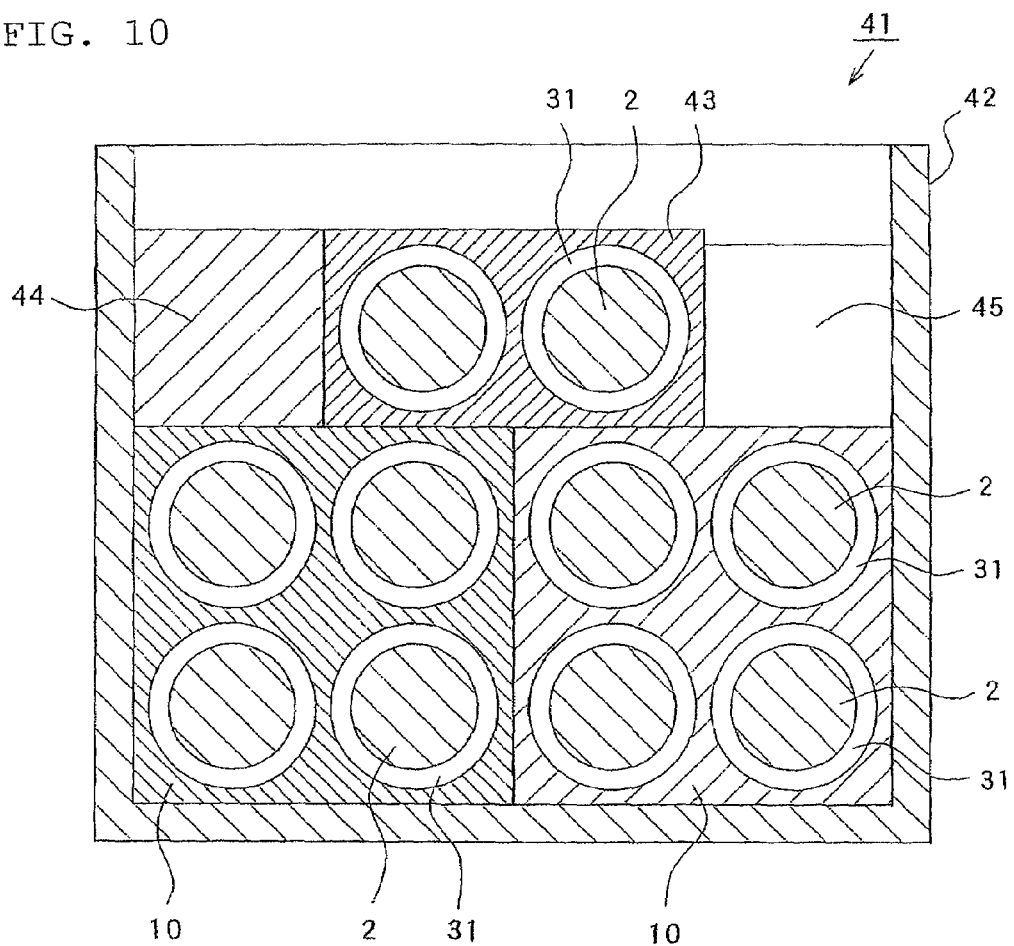
FIG. 10 is a sectional view showing the major parts of a fluid treatment apparatus according to Embodiment 3.
Figure 11:
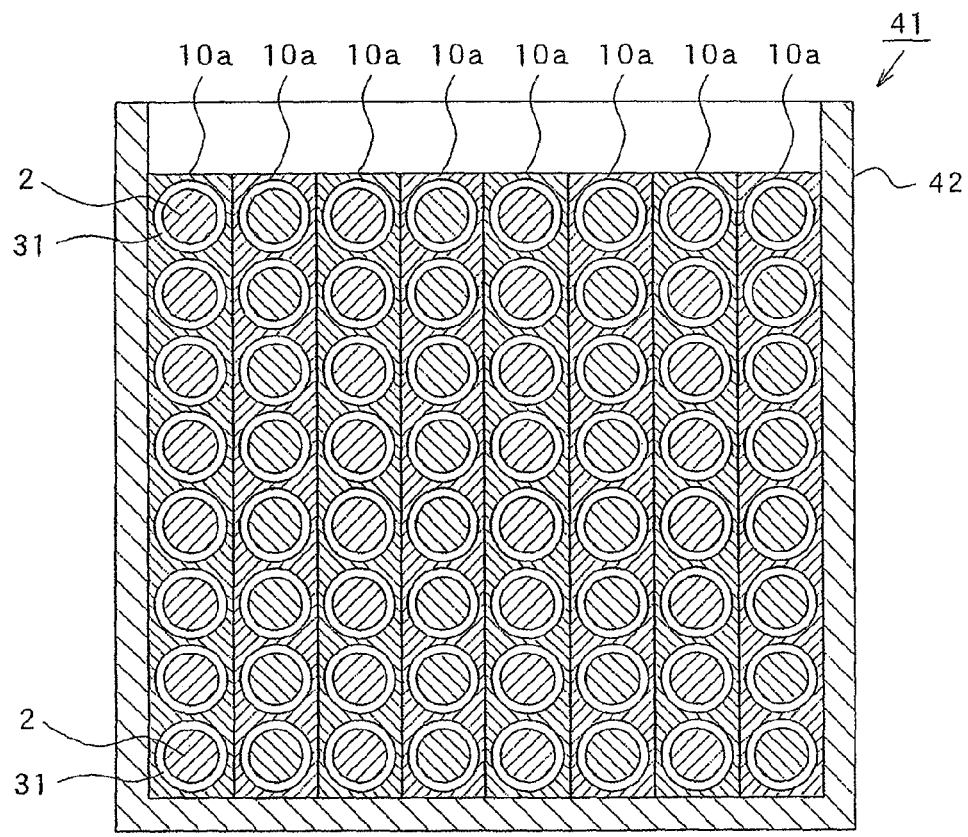
FIG. 11 is a sectional view showing the major parts of a fluid treatment apparatus according to a modified version of Embodiment 3.

FIG. 10 is a sectional view showing the major parts of a fluid treatment apparatus according to Embodiment 3 of the present invention, and FIG. 11 is a sectional view showing the major parts of a fluid treatment apparatus according to a modified version of Embodiment 3. Also, parts that are similar to those described in Embodiment 1 are given the same reference numerals, and the description thereof is omitted.

In FIG. 10, reference numeral 41 denotes a fluid treatment apparatus according to Embodiment 3, 42 denotes a treatment chamber of the fluid treatment apparatus 41, which is formed of a light material almost free from corrosion such as titanium alloy, Inconel, stainless steel, high manganese steel, synthetic resin, inorganic material, etc., to be like a rectangular parallelepiped box having a bottom with its upper surface open, and in which casings 10 having four magnets 2 accommodated at the bottom thereof are juxtaposed by two lines, 43 denotes a casing in which two magnets 2 placed on the juxtaposed casings 10 and 10 are accommodated, 44 denotes a block which is formed of metal that is difficult to corrode to be roughly like a rectangular parallelepiped and placed between the casing 43 and the inner wall of the treatment chamber 42, and 45 denotes a cavity portion formed among the casing 10, casing 43 and the inner wall of the treatment chamber 42.

In FIG. 11, reference numeral 41a denotes a fluid treatment apparatus of a modified version according to Embodiment 3, 10a denotes a longitudinal casing, in which eight through holes are formed in the longitudinal direction, having a magnet 2 accommodated in the respective through holes, and eight longitudinal casings 10a are arranged in the treatment chamber 42 in the lateral direction.

The fluid treatment apparatus 41 according to Embodiment 3 of the present invention, which is constructed as described above, is first produced by inserting the magnetic field forming device 1 for active water, which is described in connection with Embodiment 1, into the through holes of the casings 10 and 43. Next, the casings 10,10 are juxtaposed in the treatment chamber 42, and the casing 31 and the block 44 are placed thereon for completion.

The fluid treatment apparatus 41 is disposed in piping through which circulating water for a cooling tower etc., flows and may be used for activating the circulating water. Since the cavity portion 45 is formed in the treatment chamber 42, the effective sectional area of the flow path may be increased, and it is possible to flow a great deal of fluid. Since the object of the fluid treatment apparatus 41 is circulating water although a fluid flowing through the cavity portion 45 is not magnetized, all the circulating water is to be gradually magnetized as the fluid circulates in the treatment chamber 42.

Also, in the present embodiment, although a description was given of the case where three casings 10,10 and 43 are stacked in the treatment chamber 42, the embodiment is not limited to the combination, wherein the combination may be appropriately designed in compliance with the flow capacity and velocity etc.

Also, since, in the fluid treatment apparatus 41*a* according to a modified version of Embodiment 3, which is constructed as described above, the longitudinal casings 10*a* are juxtaposed by eight lines in the lateral direction in the treatment chamber 42, the longitudinal casing 10*a* may be lightened in weight to such a degree that may be conveyed by humans when carrying out maintenance etc., and any one of the eight casings 10*a* may be arbitrarily taken out from the treatment chamber 42, wherein the maintenance efficiency is excellent.

Embodiment 4

Figure 12:
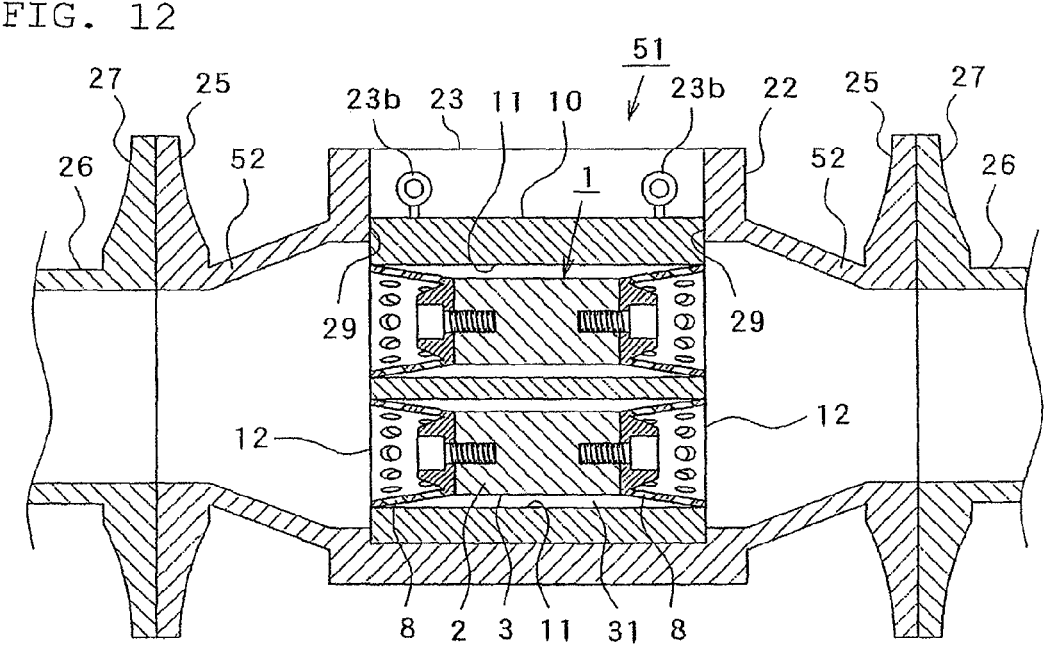
FIG. 12 is a sectional view showing a fluid treatment apparatus according to Embodiment 4.

FIG. 12 is a sectional view showing a fluid treatment apparatus according to Embodiment 4. Also, parts that are similar to those described in Embodiment 1 are given the same reference numerals, and the description thereof is omitted.

In the drawing, reference numeral 51 denotes a fluid treatment apparatus according to Embodiment 4, 52 denotes a communication tube one end of which is connected to piping 26, and the other end of which is connected to the treatment chamber 22. The sectional area of a flow path of the communication tube 52 is formed so as to become gradually wider from one end to the other end of the communication tube 52.

The fluid treatment apparatus according to the present embodiment does not have the distribution portion 30 as in the fluid treatment apparatus described in regard to Embodiment 1 (referred to FIG. 6). However, since the sectional area of the flow path of the communication tube 52 is formed to become gradually wider toward the treatment chamber 22, a fluid flowing through the communication tube 52 from the piping 26 to the treatment chamber 22 may be decelerated.

As described above, since the fluid treatment apparatus 51 according to Embodiment 4 of the present invention is constructed as described above, the following action may be brought about in addition to the actions described in Embodiment 1.

(1) Since the sectional area of the flow path of the communication tube 52 is formed to become gradually wider toward the treatment chamber 22, the fluid flown from the piping 26 into the communication tube 52 may be decelerated, and may be evenly brought into four through holes 11, wherein activation treatment may be securely carried out by magnetization of the fluid.

Embodiment 5

Figure 13:
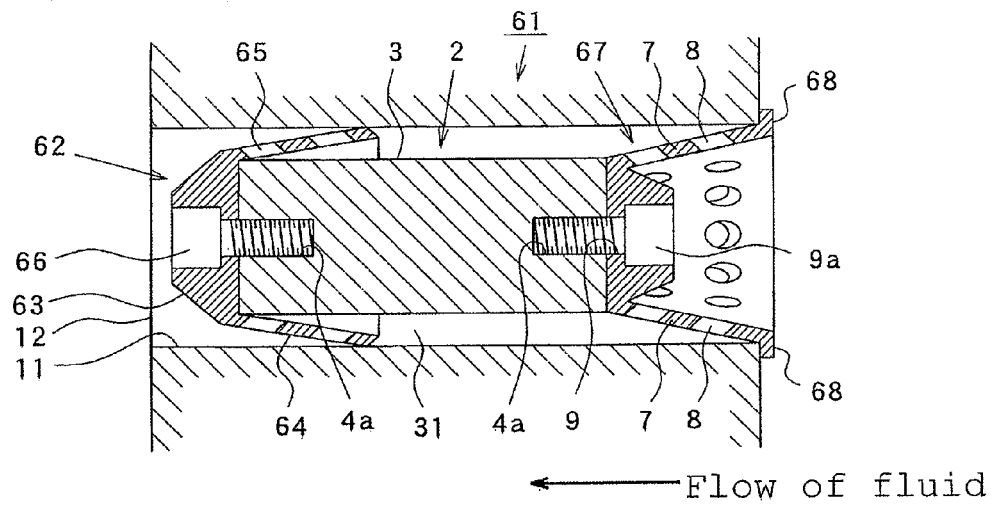
FIG. 13 is a sectional view showing a state where a magnetic field forming device for active water according to Embodiment 5 is inserted into a through hole.

FIG. 13 is a sectional view showing a state where a magnetic field forming device for active water according to Embodiment 5 is inserted into a through hole. Also, parts that are similar to those described in Embodiment 1 are given the same reference numerals, and the description thereof is omitted.

In the drawing, reference numeral 61 denotes a magnetic field forming device for active water according to Embodiment 5, 62 denotes a guide member adhered to and fixed to one end side of the magnet 2, 63 denotes a base portion of the guide member 62, which is formed to have the same outer diameter as the outer diameter of the magnet 2 and is brought into contact with the end side 4 of the magnet 2, 64 denotes an inclined portion, which has its diameter reduced to the base portion 63, is formed to be annular-shaped, and extends on the side 3 of the magnet 2, wherein one edge end of the inclined portion 64 is brought into contact with the edge of the side 3 of the magnet 2, and the other edge end of the inclined portion 64 is brought into contact with the inner wall of the through hole 11. Reference numeral 65 denotes a plurality of communication portions formed so as to pass through the inclined portion 64 of the guide member 62, and 66 denotes a screwing member that is inserted into a hole portion formed at the center of the base portion 63, is screwed in the threaded hole portion 4*a* formed at the end side 4 of the magnet 2, and pushes and fixes the base portion 63 at the magnet 2. Reference numeral 67 denotes a guide member adhered to and fixed to the other end side of the magnet 2, and 68 denotes a fall-out preventing portion in which the edge end of the inclined portion 7 extends largely than the inner diameter of the opening portion 12 of the through hole 11 and is brought into contact with the opening portion 12 of the casing 10.

A method for producing a magnetic field forming device 61 for active water according to Embodiment 5 of the prevent invention, which is constructed as described above, is similar to the method described in connection to Embodiment 1. Therefore, the description thereof is omitted.

Where the magnetic field forming device 61 for active water is inserted into a through hole 11, after the guide member 62 is first inserted into the opening portion 12 of the through hole 11, the other guide member 67 is manually pushed in to cause the guide member 62 to slide in the through hole 11. Since the maximum outer diameter of the guide member 62 is larger than the outer diameter of the magnet 2, the magnet 2 may be smoothly pushed in with predetermined spacing maintained with respect to the through hole 11 without being attracted to the inner wall of the through hole 11 by the magnetic force. As the other guide member 67 reaches the opening portion 12, the other guide member 67 may be also smoothly inserted into the opening portion 12 since the inclined portion 7 is slidingly guided to be brought into contact with the edge of the opening portion 12. The guide member 67 is pushed into the through hole 11 until the fall-out preventing portion 68 is brought into contact with the casing 10, and the magnet 2 is disposed inside the through hole 11.

Since the fluid treatment apparatus 61 according to Embodiment 5 of the present invention is constructed as described above, the following actions may be brought about in addition to the actions described in connection with Embodiment 1.

(1) Since the guide member 62 includes the inclined portion 64 extending at the side 3 of the magnet 2, the guide member 62 may be smoothly inserted into the through hole 11.

(2) Since the fall-out preventing portion 68 is formed at the edge end of the inclined portion 7 of the guide member 67, there is no fear that, by arranging piping etc., so that a fluid is brought from the guide member 67 side into the fluid flow path 31, the magnetic field forming device 61 for active water falls out from the through hole 11 due to a force etc., of the fluid, wherein excellent reliability is brought about.

Embodiment 6

Figure 14A:
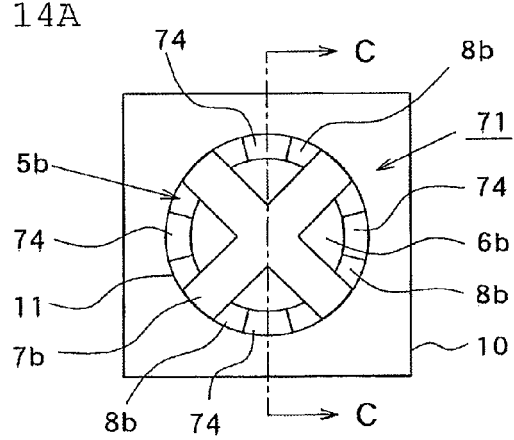
FIG. 14A is a right side view showing a state where a magnetic field forming device for active water according to Embodiment 6 is inserted into a through hole.
Figure 14B:
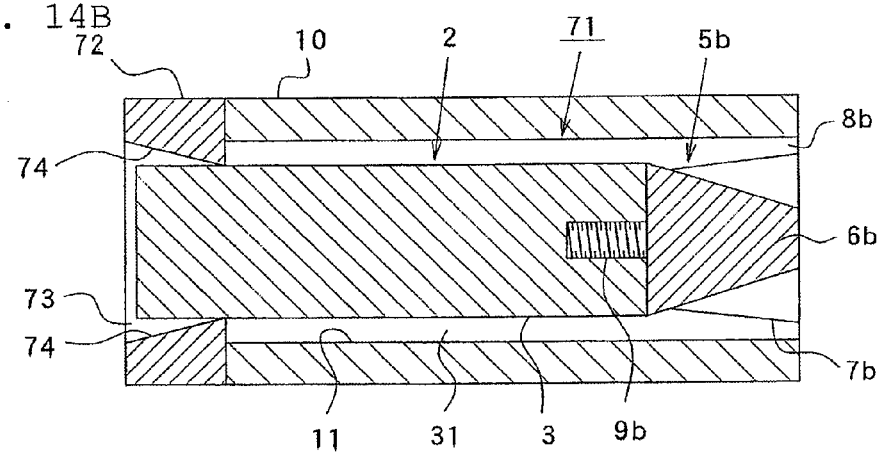
FIG. 14B is a sectional view taken along the line C-C.

FIG. 14A is a right side view showing a state where a magnetic field forming device for active water according to Embodiment 6 is inserted into a through hole, and FIG. 14B is a sectional view taken along the line C-C. Also, parts that are similar to those described in Embodiments 1 and 2 are given the same reference numerals, and the description thereof is omitted.

In the drawing, reference numeral 71 denotes a magnetic field forming device for active water according to Embodiment 6, wherein a guide member 5b (referred to FIG. 9) according to the modified version of Embodiment 2 is adhered to and fixed to one end part of the magnet 2. Reference numeral 72 denotes a casing side guide member that is adhered to and fixed to the end side of the casing 10 by means of bolts etc., and is formed of a non-magnetizable material to be plate-like. Reference numeral 73 denotes a guide member through hole that is formed at the casing side guide member with the same inner diameter and the same sectional shape as those of the through hole 11 of the casing 10. Reference numeral 74 denotes a protruding portion formed so as to project at a plurality of symmetrical points inside the guide member through hole 73. The protruding portion 74 is formed to be tapered so as to become gradually higher toward the casing 10 side, wherein the maximum height of the protruding portion 74 is formed to be the same as the size of the spacing between the side 3 of the magnet 2 and the wall surface of the through hole 11, and the width of the protruding portion 74 is formed to be narrower than the width of the communication portion 8b of the guide member 5b. That is, the magnet 2 inserted in the guide member through hole 73 is supported at the tip end of the protruding portion 74 with spacing with respect to the inner circumferential portion of the guide member through hole 73.

Since a method for producing a magnetic field forming device 71 for active water according to Embodiment 6, which is constructed as described above, is similar to the method described in connection with Embodiment 1, and the description thereof is omitted.

Where the magnetic field forming device 71 for active water is inserted into the through hole 11, the protruding portion 74 of the casing side guide member 72 is first arranged in positions so that it is caused to enter the communication portion 8b between the inclined portions 7b of the guide member 5b, and the guide member 5b is inserted into the guide member through hole 73 of the casing side guide member 72. By manually pushing in the magnet 2, the guide member 5b is caused to slide in the through hole 11. Since the guide member 5b is provided, the magnet 2 is smoothly pushed in with spacing maintained with respect to the through hole 11 without being attracted to the inner wall of the through hole 11 by the magnetic force. The side 3 of the magnet 2 is supported by the protruding portion 74 of the casing side guide member 72, and is disposed in the through hole 11 with spacing secured with respect to the inner wall of the through hole 11.

Since the fluid treatment apparatus 61 according to Embodiment 6 of the present invention is constructed as described above, the following action may be brought about in addition to the actions of Embodiment 1.

(1) The casing side guide member 72 in which the guide member through hole 73 is formed is adhered to and fixed to the end side of the casing 10, the guide member through hole 73 is formed in the casing side guide member 72 with the same shape and the same inner diameter as those of the through hole 11, and the protruding portion 74 is formed on the inner circumferential portion of the guide member through hole 73. Therefore, the magnet 2 having the guide member 5b adhered to and fixed to one end part thereof may be concentrically disposed in the through hole 11.

Also, in the present embodiment, a description was given of the case where the magnet 2 is disposed using the casing side guide member 72 having the protruding portion 74 formed thereon. However, there may be cases where a ring-shaped spacing retaining member having a groove, which is formed of a non-magnetizable material is fitted to the side 3 of the magnet 2 without using the casing side guide member 72. By forming the spacing retaining member to the thickness equivalent to the spacing between the side 3 of the magnet 2 and the inner wall of the through hole 11, a fluid may be flown into the groove formed in the spacing retaining member. In this case, actions similar to those in Embodiment 6 may be brought about.

INDUSTRIAL APPLICABILITY

The present invention relates to a magnetic field forming device for active water, which carries out activation treatment by causing a fluid to pass through a magnetic field, and a fluid treatment apparatus using the same. The invention may provide a magnetic field forming device for active water, which is capable of uniformly forming a high magnetic field free from any unevenness in the magnetic field intensity, activating a fluid regardless of the orientation of magnetic polarity of the magnets, bringing about excellent assembling efficiency not requiring assembling while checking the orientation of the magnets, being manufactured at a high product yield ratio without occurrence of defective products resulting from a difference in the orientation of the magnets, remarkably easily taking out the magnets without use of any exclusive special tool, and removing rust and stains adhered to the magnets by wiping off the magnets one by one, the maintenance efficiency of which is excellent, and the invention may provide a fluid treatment apparatus, having excellent assembling efficiency, maintenance efficiency and versatility, capable of being produced at a high product yield ratio without occurrence of defective products resulting from a difference in the orientation of the magnets, remarkably easily inserting and detaching the magnets, easily increasing the allowable quantity of flow and activating a fluid flowing in a piping etc., having a large caliber, in which magnets may be remarkably inserted and removed with ease.

The invention claimed is:

1. A magnetic field forming device for active water, which has a fluid flow path formed in a through hole, comprising:
   a rod-shaped magnet disposed with predetermined spacing with respect to an inner wall of the through hole and having the fluid flow path formed between the inner wall and a side of the magnet;
   a guide member that is adhered to and fixed to one end or both ends of the magnet and is inserted into an interior of the through hole; and
   a communication portion formed in the guide member and communicating with the fluid flow path;
   wherein the through hole extends in an axial direction from one end to another end and has an axial center line,
   wherein a widest part of the guide member in a direction which is perpendicular to the axial direction is smaller than an opening portion at the one end of the through hole, wherein the guide member has an inclined portion which is inclined relative to the center line such that portions of the inclined portion which are located closer to the magnet are provided closer to the center line than portions of the inclined portion which are located farther away from the magnet, wherein the inclined portion of the guide member is defined by a plurality of inclined portions which are inclined relative to the center line such that portions of the inclined portions which are located closer to the magnet are provided closer to the center line than portions of the inclined portions which are located farther away from the magnet, wherein the inclined portions protrude from an outer perimeter of a base portion in a direction which is perpendicular to the axial direction so as to form a radial or cross shape, and wherein the communication portion is formed in spacing between adjacent inclined portions and the inner wall of the through hole.

2. The magnetic field forming device for active water according to claim 1, wherein the guide member is formed of a non-magnetizable material.

3. A fluid treatment apparatus, comprising: a casing having one or a plurality of through holes formed therein; and a magnetic field forming device for active water internally inserted into the through hole(s) of the casing according to claim 1 or 2.

4. The fluid treatment apparatus according to claim 3, wherein the casing is formed of a magnetizable material.

5. The fluid treatment apparatus according to claim 3, further comprising:
    piping which is provided both upstream and downstream from the casing; and
    a treatment chamber disposed inline with the piping, and in which the casing is detachably accommodated.

6. The fluid treatment apparatus according to claim 4, further comprising:
    piping which is provided both upstream and downstream from the casing; and
    a treatment chamber disposed inline with the piping, and in which the casing is detachably accommodated.

7. The magnetic field forming device for active water according to claim 1, wherein the communication portion is formed in the inclined portion.

8. The magnetic field forming device for active water according to claim 1,
    wherein the base portion has a conical shape, and
    wherein portions of the base portion which are located closer to the magnet have larger diameters than portions of the base portion which are located farther away from the magnet.

* * * * *